Nov. 2, 1965

L. J. DI PERI 3,214,936

DRY-AIR EVAPORATIVE COOLER

Filed March 3, 1964

INVENTOR.
LEONARD J. DI PERI
BY
Wm. H. Trimmell
AGENT

Nov. 2, 1965 L. J. DI PERI 3,214,936
DRY-AIR EVAPORATIVE COOLER
Filed March 3, 1964 3 Sheets-Sheet 2

INVENTOR.
LEONARD J. DI PERI
BY
W. V. Mannell
AGENT

Nov. 2, 1965   L. J. DI PERI   3,214,936
DRY-AIR EVAPORATIVE COOLER
Filed March 3, 1964   3 Sheets-Sheet 3
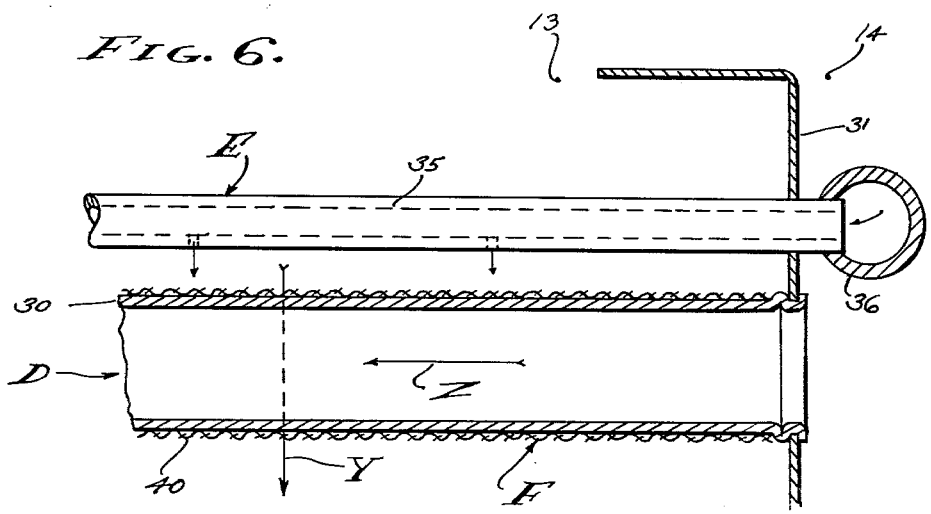
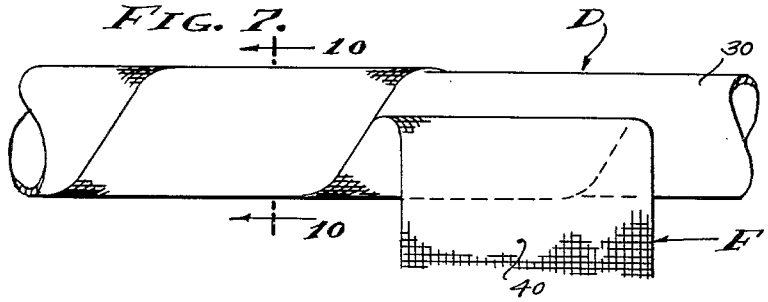
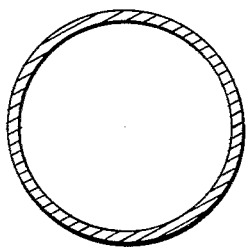 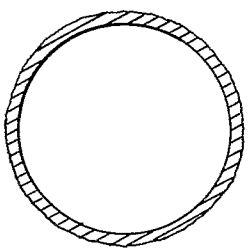 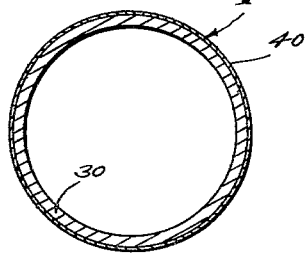
INVENTOR.
LEONARD J. DI PERI
BY
AGENT United States Patent Office 3,214,936
Patented Nov. 2, 1965

3,214,936
DRY-AIR EVAPORATIVE COOLER
Leonard J. Di Peri, Northridge, Calif., assignor of sixty percent to Leonard J. Di Peri, Northridge, Calif., thirty-five percent to Donald W. Burt and five percent to John E. McIver, Jr., both of Chatsworth, Calif.
Filed Mar. 3, 1964, Ser. No. 348,941
8 Claims. (Cl. 62—314)

This invention relates to air coolers of the evaporative type wherein liquid evaporation in intimate contact with air causes a reduction in temperature of air. Heretofore, air coolers of this type have been characterized by the direct contact of the evapoartive liquid with the air to be cooled, with the result that the cooled air is increased in humidity. With these few factors in mind it is a primary object of this invention to provide an air cooler employing the liquid evaporation principle but which is not adversely affected by increased humidity in the useful cooled air.

Air coolers of the type under consideration employ the phenomenon of liquid evaporation accompanied by temperature change. By permitting liquid evaporation to occur the temperature change is from higher to lower temperature, and it is the transition of said liquid into a surrounding gas with which this invention is concerned. Specifically, the usual evaporative air cooler employs water as the liquid, and the water evaporates into a moving column of air which is the useful air per se. Obviously, this useful air is thereby additionally humidified.

Because of the humidity increase in operating ordinary evaporative coolers (above described) they can only be put to limited use. That is, satisfactory operation of ordinary evaporative coolers can only be expected where climatic conditions provide dry air. Otherwise, or if climatic conditions provide high humidity, the resultant cooled air of even greater humidity becomes unbearable even though it is cooled. Further, where higher humidity prevails as a general climatic condition, the amount of evaporation is reduced and to the end that a lesser degree of heat reduction is produced in the useful air, it being or no great advantage to merely deliver a greater volume of but slightly changed air.

An object of this invention is to provide means for separating flow of air in an evaporative cooler in order to provide flow of refrigerating air separate and independent of the flow of useful air.

Another object of this invention is to provide means in an evaporative cooler to divide the flow of air from a single source and directed separately; in the first instance as a moving column of refrigerating air and in the second instance as a moving column of useful air to be delivered for air conditioning purposes and the like.

It is an object of this invention to provide means that intimately associates a first column of air with water for effecting evaporative principles and that transfers heat change into a second column of air referred to as useful air. The said first column of air is referred to herein as refrigerating air.

It is another object of this invention to provide heat transfer means in an evaporative cooler of the type under consideration and wherein close association of two separate columns of air is made with a common evaporative liquid, whereby said liquid humidifies but one column of air.

It is still another object of this invention to provide a heat transfer tube wherein the (outside) surface of the tube holds a film of liquid for evaporation thereon and whereby heat is absorbed into the tube for dissipation at the other (inside) surface isolated from the first mentioned surface.

The various objects and features of this invention will be fully understood from the following detailed description of the typical preferred forms and applications thereof, throughout which description reference is made to the accompanying drawings, in which:

FIG. 1 is a perspective view showing the preferred embodiment of the present invention.

FIGS. 2 and 3 are enlarged sectional views taken as indicated by lines 2—2 and 3—3 on FIG. 1.

FIG. 6 is an enlarged fragmentary section of a portion of the structure shown in FIG. 2.

FIG. 7 is an enlarged detailed fragmentary view of one of the tubes which characterizes the invention.

FIGS. 8, 9 and 10 are sectional views of the tube that I prefer to employ, FIG. 10 being taken as indicated by line 10—10 on FIG. 7.

The air cooler of the present invention is a "dry air evaporative cooler" wherein the useful air is lowered in temperature without adding moisture thereto from the liquid that is evaporated in order to cause the cooling effect.

A known natural phenomenon is the said cooling effect which prevails when liquid such as water is evaporated, and said cooling or change in heat must and is conducted away from the place where the phenomenon takes place. Ordinary coolers of the type under consideration conduct the change in heat directly into the single column of air which intimately and directly contacts the liquid, and the remainder of heat change is absorbed into the structure without benefit. Since denser materials absorb heat change more efficiently, as a general rule, the structure in an ordinary evaporative cooler absorbs substantial heat change and the useful air carries away the remainder. With the air cooler of the present invention the change in heat is not direct but is indirect and utilizes the heat transfer advantages of denser materials in separating refrigerating air from useful air. Thus, there is a cooler structure X that handles separate columns of air, namely refrigerating air Y and useful air Z.

The cooler structure X can vary widely in size, shape and mode of construction and it is shown as a frame of box-like construction having an intake plenum A, a heat transfer plenum B, and air pump means C moving the two separate columns of air through the heat transfer plenum B. In accordance with the invention air separation means D is provided in the heat transfer plenum B to separately pass the two moving columns of air, and liquid distributing means E and evaporative means F are provided and associated with the air separating means D to cause evaporation of one of the columns of air and to cause absorption of heat change into the other column of air.

Figure 1:
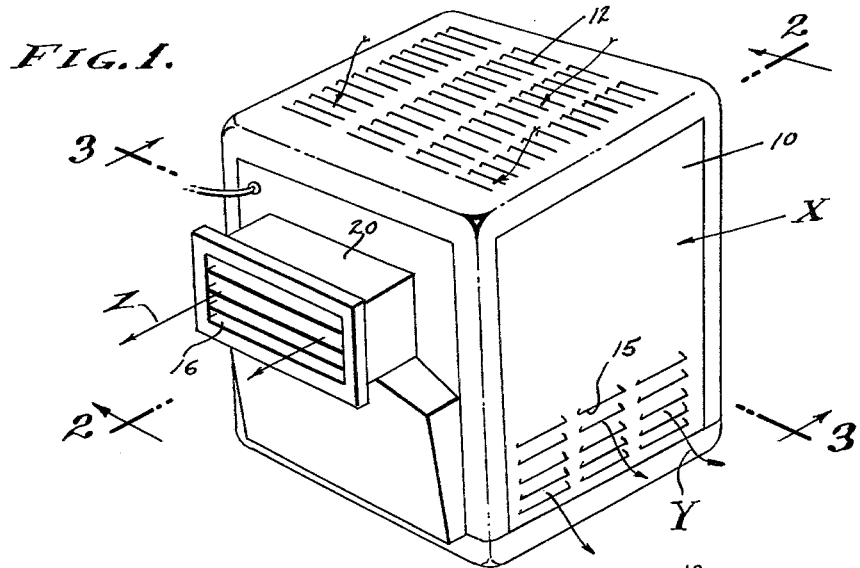
Figure 2:
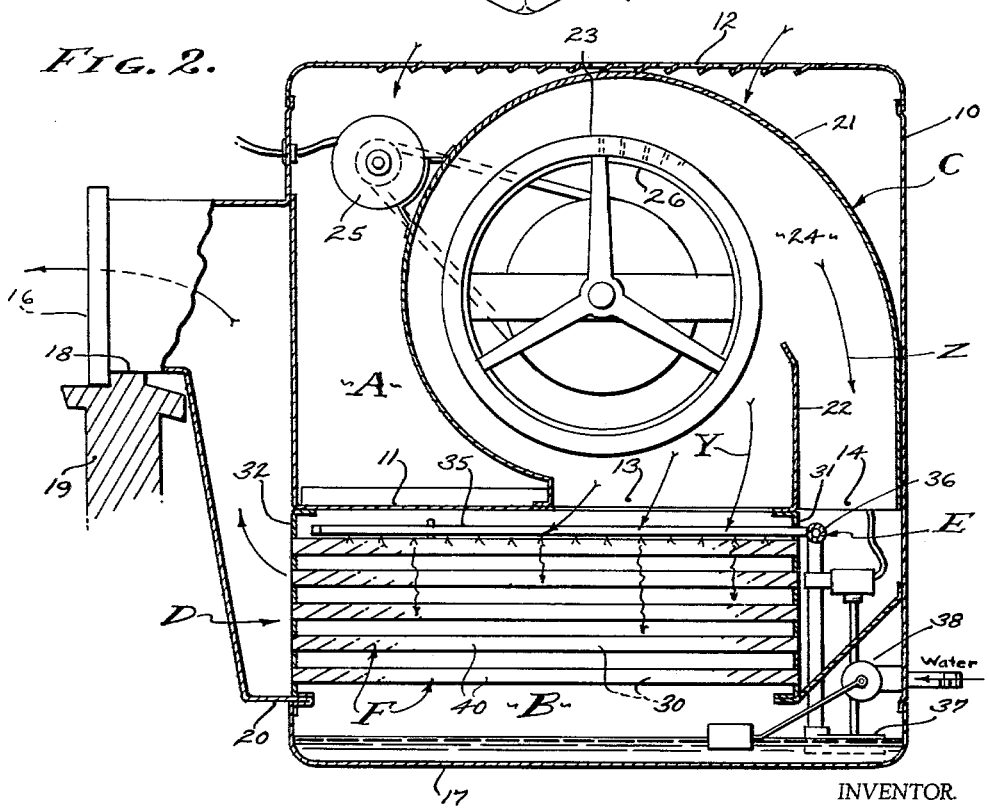
Figure 3:
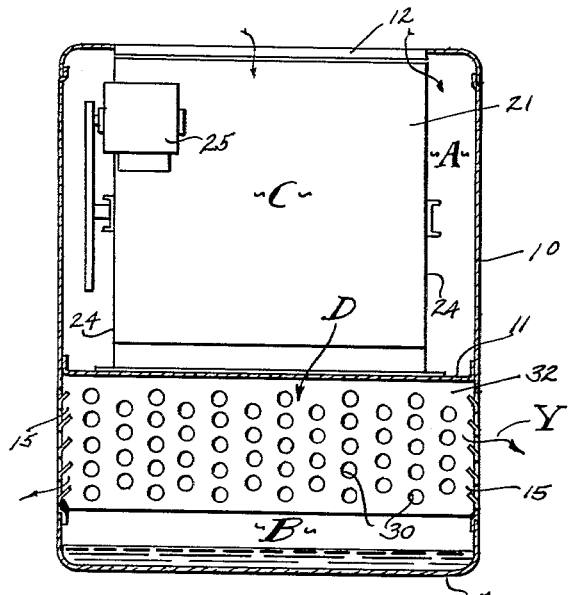

The elements A through F are shown as being incorporated in a box-like structure in order to form a compact unit, see FIG. 1. In this connection it is significant that a single air pump means C is utilized for moving the separated columns of air Y and Z through the heat transfer plenum B and whereby most efficient use is made of space and materials. In the preferred form of the invention the cooler structure X comprises a rectangular and substantially square housing 10 with the intake plenum A occupying the upper portion and the heat transfer plenum B occupying the lower portion thereof. In practice, a horizontal floor 11 divides the housing into the two plenums, there being air inlet openings 12 into the plenum A, and both refrigerating air and useful air inlet openings 13 and 14, and outlet openings 15 and 16 at the plenum B. Since the floor 11 is common to both plenums A and B the said inlet openings 13 and 14 are formed therein so as to deliver separate columns of air between the said plenums, associated with the air pump means C as will be described. Because evaporative liquid is to be used and conserved within the cooler structure X the bottom or pan 17 is in the nature of a basin for collection of drippings which coalesce therein to be recirculated. Therefore, the outlet openings 15 and 16 are at the sides of the lower portion of the box-like structure, said openings 12 and 15 being louvered openings, as shown.

In the form illustrated the cooler structure X is adapted to be suspended from a window opening 18 and the outside of a building wall 19, in which case a duct 20 projects from one side wall of the housing 10 and from opening 16. It is preferred that the duct 20 extend up the side of the housing and that it be turned so as to discharge horizontally away from the top portion of the housing, whereby said duct can enter the opening 18 with the housing 10 depending at the wall 19 beneath said opening 18.

The air pump means C can be two independent means but it is advantageously a single means wherein a blower scroll 21 is entered into by a divider 22 in order to isolate two columns of air Y and Z. To this end the centrifugal or barrel type blower wheel 23 is disposed on a transverse axis extending horizontally through the housing 10, substantially central of the plenum A. The wheel 23 can be the full width of the housing 10 but is shown of a lesser width in which case the blower has sides 24 spaced inward of the housing sides. The wheel 23 is carried on suitable bearings and is driven by a motor 25. The scroll 21 is involute and surrounds the wheel 23, commencing with a minor radius at the center of floor 11 and terminating with a major radius at the edge of said floor and at the side of the housing opposite the outlet opening 16. With the arrangement shown in the drawings the air pump means C is shaped to receive air through ports 26 at its sides 24 and to deliver air at the floor 11 between the center and said one edge thereof.

In accordance with the invention the inlet openings 13 and 14 are located in the floor 11 in order to receive predetermined proportions of air delivered by the wheel 23. The said predetermined portions of air are allocated to the two inlet openings by the provision of the divider 22 which extends between the sides 24 of the air pump and upwardly within the blower scroll 21. The divider 22 terminates at the periphery of the wheel 23 and the position of its termination controls the portion of air which is directed in front of or behind said divider. As Illustrated, the front of the divider 22 establishes a duct leading to opening 13 while the back of the divider 22 establishes a duct leading to opening 14. Duct and opening 14 is of lesser cross sectional area than the duct and opening 13, whereby the refrigerating air Y exceeds the useful air Z, in volume.

The separating means D is provided for cooperatively transporting the air columns Y and Z through the plenum B. The means D thoroughly associates all of each column of air with the other without comingling the same and to this end isolates the said two columns by transporting one column of air through heat transfer tubes 30. In the preferred form the useful air Z is transported through or within the tubes 30 while the refrigerating air Y is transported around or over the tubes 30. The said columns of air are evenly distributed within and over the said tubes 30, said tubes being arranged in spaced parallel relationship. In the particular case illustrated the plurality of tubes 30 open at a plate 31 which cooperates with the sides of the housing to form a duct in communication with opening 14 and the back side of divider 22. The tubes 30 also open at a plate 32 and into the duct 20. Thus, useful air Z is transported through the tubes 30 and to the duct 20 to discharge at opening 16.

The refrigerating air Y is transported from opening 13 over the tubes 30 and to discharge at openings 15.

The liquid distributing means E can vary as circumstances require and is shown as a soaker which involves a liquid carrying conduit 35 disposed above each vertical arrangement of tubes 30. The conduits 35 are joined by a manifold 36 and the conduits are perforated so as to discharge downwardly onto the vertical arrangement of tubes. As shown, there is a motor driven pump 37 that recirculates water from pan 17, and there is a water level controlled water supply 38 to maintain water at the desired level in said pan. With this arrangement the tubes 30 are constantly wetted.

In accordance with the invention and with the arrangement of elements hereinabove described, I provide evaporative means F associated with the heat transfer tubes 30 to effect a heat change when brought into intimate contact with the moving refrigerating air Y. The means F is operative to cause evaporation of liquid to take place on and preferably close to the surface of each tube 30. In practice, it has been found that a deep layer of liquid at the tube surface is not so effective as a thin layer, it being advantageous to cause evaporation to take place as close as possible to the outside surface of the tube. Therefore, the tube can be of heat conductive material (thin walled aluminum tubing) with a smooth exterior wall as shown in FIG. 8 and thoroughly wetted by means E; or the tube can be of heat conductive material with an exterior wall provided with a surface treatment and roughened as shown in FIG. 9 so as to enhance capillary attraction and thereby assure thoroughness of wetting by means E; or the tube can be of heat conductive material wrapped with a liquid absorptive material as shown in FIGS. 6, 7 and 10 that thoroughly distributes and wets the entire tube surface; all to the end that a uniform layer of water clings to the outside surface of the tube.

From the foregoing description will be seen that the air cooler structure X causes two separated columns of air Y and Z to be transported through the plenum B. The two moving columns of air are drawn from the plenum A by a single air pump means C and the divider 22 initially separates the intake air as it leaves the periphery of the blower wheel 23 of the pump means C. Upon separation of the moving air into refrigerating air Y and useful air Z, the said columns Y and Z are transported through the plenum B in a manner to advantageously employ the phenomenon of evaporative cooling and to simultaneously transfer heat change into the useful air. The separating means D in the form of heat transfer tubes 30 is employed for this purpose, the refrigerating air Y being transported through plenum B surrounding the tubes 30, and the useful air Z being transported through the plenum B by confining said air Z within the tubes 30. By so doing, the two columns of air are closely associated by virtue of the large surface area of the thin walled tubes 30 made of high heat conductive material. In accordance with the invention a thin film or covering of water is applied to the tubes 30 and the tubes are maintained in this wetted condition. Thus, heat change is efficiently transmitted to the interior wall of the tubing where the heat change is absorbed by the moving column of useful air Z.

By constructing the cooling structure X generally as described, dry and cooled air of the column Z is discharged from the opening 16. The additionally humidified air of column Y is exhausted from opening 15. The relative volumes of the two air columns Y and Z can be varied as circumstances require and it is possible for example to increase the volume of refrigerating air Y while reducing the volume of useful air Z, and in this case the rate of evaporative cooling is increased relative to the volume of useful air being delivered whereby the said useful air is cooled to a greater extent. As a result, the humidity of the useful air Z is virtually unaffected while the temperature thereof is materially decreased.

Figure 4:
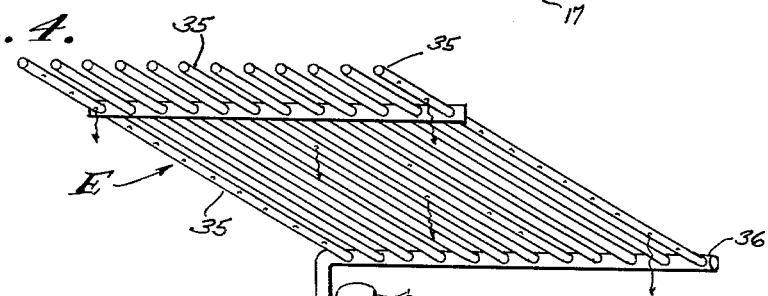
FIGS. 4 and 5 are perspective views of two of the main elements of the structure as they would appear removed from the housing shown in FIG. 1.
Figure 5:
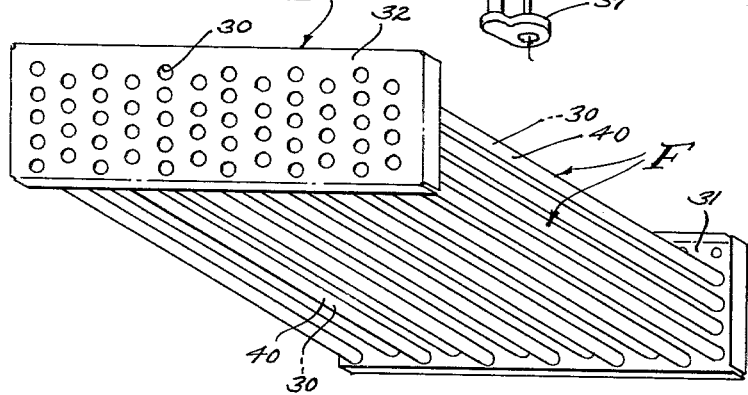

In FIG. 5 I have shown a unit of construction which involves the separating means D and the evaporative means F. In the broad sense these two means associated as they are constitute the unit shown in FIG. 5 comprising the essentials of the present invention. Therefore, it is the means D that separates air into two columns and the means F that is associated with the said means D which makes the unit of FIG. 5 completely operable in itself as a dry-air evaporative cooler. In order to carry out the invention in this bare essential form, the column of useful air Z which passes through the tubes 30 is permitted to move as by convection phenomenon (a pump means) while the ambient outside air Y is simply permitted to surround the tubes 30 with the surface treatment thereof to promote thorough evaporation. Thus, by providing a wetting device, such as the liquid distributing unit means E shown in FIG. 4, an operative dry-air evaporative cooler is in operation, and which cooler may be mounted and/or housed as circumstances require.

Having described only typical preferred forms and applications of my invention, I do not wish to be limited or restricted to the specific details herein set forth, but wish to reserve to myself any modifications or variations that may appear to those skilled in the art and fall within the scope of the following claims.

Having described my invention, I claim:

1. An evaporative cooler wherein air is lowered in temperature without adding moisture thereto, and including:
   (a) a housing with a floor therein dividing said housing into two plenums, therebeing air inlet openings in one plenum and air exhaust openings in the other plenum;
   (b) an air pump means within the inlet plenum and with a blower scroll delivering air from said inlet plenum through separate openings in said floor and into the exhaust plenum;
   (c) an air separating means in the exhaust plenum and associated with said separate opening to separately pass independent columns of air, one column being exhausted through said exhaust openings and the other column being usefully exhausted from said air separating means;
   (d) and liquid distributing means discharging into the column of air exhausted from the said air exhaust openings, whereby the usefully exhausted column of air is isolated from said liquid.

2. An evaporative cooler wherein air is lowered in temperature without adding moisture thereto, and including:
   (a) a housing with a floor therein dividing said housing into two plenums, there being air inlet openings, in one plenum and air exhaust openings in the other plenum;
   (b) an air pump means within the inlet plenum and with a blower scroll delivering air from said inlet plenum through adjacent openings in said floor and separately into the exhaust plenum;
   (c) a divider separating said adjacent openings and entering into said blower scroll allocating the volume of air directed through said separated openings;
   (d) an air separating means in the exhaust plenum and associated with said separated openings to separately pass independent columns of air, one column being exhausted through said exhaust openings and the other column being usefully exhausted from said air separating means;
   (e) and liquid distributing means discharging into the column of air exhausted from the said air exhaust openings, whereby the usefully exhausted column of air is isolated from said liquid.

3. An evaporative cooler wherein air is lowered in temperature without adding moisture thereto, and including:
   (a) a housing with a floor therein dividing said housing into two plenums, there being air inlet openings in one plenum and air exhaust openings in the other plenum;
   (b) an air pump within the inlet plenum and comprising a scroll with a blower wheel therein delivering air from said inlet plenum through adjacent openings in said floor and separately into the exhaust plenum;
   (c) a divider separating said adjacent openings and entering into said blower scroll into close proximity to the blower wheel allocating the volume of air directed through said separated openings;
   (d) an air separating means in the exhaust plenum and associated with said separated openings to separately pass independent columns of air, one column being exhausted through said exhaust openings and the other column being usefully exhausted from said air separating means;
   (e) and liquid distributing means discharing into the column of air exhausted from the said air exhaust openings, whereby the usefully exhausted column of air is isolated from said liquid.

4. An evaporative cooler wherein air is lowered in temperature without adding moisture thereto, and including:
   (a) a housing with a floor therein dividing said housing into two plenums, there being air inlet openings in one plenum and air exhaust openings in the other plenum;
   (b) an air pump means delivering air from one plenum into the other and through adjacent openings in said floor;
   (c) an air separating means in the exhaust plenum and associated with said adjacent openings to separately pass two independent columns of air and comprising a plate separating said adjacent openings and heat transfer tubes opening at the plate and communicating with one of said openings, and the exterior of said tubes being exposed to the column of air passing through the other of said openings, the two columns of air passing within and over the tubes from said separate openings;
   (d) and liquid distributing means discharging into the column of air exhausted from the said air exhaust openings, whereby the usefully exhausted column of air is isolated from said liquid.

5. An evaporative cooler wherein air is lowered in temperature without adding moisture thereto, and including:
   (a) a housing with a floor therein dividing said housing into two plenums, there being air inlet openings in one plenum and air exhaust openings in the other plenum;
   (b) an air pump means delivering air from one plenum into the other plenum and through adjacent openings in said floor;
   (c) an air separating means in the exhaust plenum and associated with said adjacent openings to separately pass two independent columns of air and comprising a plate angularly disposed to the floor of the housing and separating said adjacent openings and comprising heat transfer tubes opening through the plate to receive the column of air from one of said openings and separately exposed to the column of air from the other of said openings, the two columns of air passing within and over the tubes from said separate openings;
   (d) and liquid distributing means discharging over said tubes, whereby liquid evaporation takes place in the said column of air passing over said tubes and heat transfer takes place through the said tubes and affects the other column of air within the said tubes.

6. An evaporative cooler wherein air is lowered in temperature without adding moisture thereto, and including:
   (a) a housing with a floor therein dividing said housing into two plenums, there being air inlet openings in one plenum and air exhaust openings in the other plenum;

(b) an air pump means within the inlet plenum and with a blower scroll delivering air from said inlet plenum through separate openings in said floor and into the exhaust plenum;

(c) an air separating means in the exhaust plenum and associated with said separate openings to separately pass two independent columns of air and comprising a plate angularly disposed to the floor of the housing and separating said adjacent openings and comprising heat transfer tubes opening through the plate to receive the column of air from one of said openings and separately exposed to the column of air from the other of said openings, the two columns of air passing within and over the tubes from said separate openings;

(d) liquid distributing means discharging over said tubes, whereby liquid evaporation takes place in the column of air passing over the said tubes;

(e) and said tubes being roughened to attract liquid thereto for said evaporation, whereby heat transfer takes place through the said tubes and affects the other column of air within the said tubes.

7. An evaporative cooler wherein air is lowered in temperature without adding moisture thereto, and including:

(a) a housing with a floor therein dividing said housing into two plenums, there being air inlet openings in one plenum and air exhaust openings in the other plenum;

(b) an air pump within the inlet plenum and comprising a scroll with a blower wheel therein delivering air from said inlet plenum through adjacent openings in said floor and separately into the exhaust plenum;

(c) a divider separating said adjacent openings and entering into said blower scroll into close proximity to the blower wheel allocating the volume of air directed through said separated openings;

(d) an air separating means in the exhaust plenum and associated with said adjacent and separated openings to separately pass two independent columns of air and comprising a plate angularly disposed to the floor of the housing and separating said adjacent openings and comprising heat transfer tubes opening through the plate to receive the column of air from one of said openings and separately exposed to the column of air from the other of said openings, the two columns of air passing within and over the tubes from said separate openings;

(e) liquid distributing means discharging over said tubes, whereby liquid evaporation takes place in the column of air passing over the said tubes;

(f) and said tubes being roughened to maintain a film of liquid thereon for said evaporation, whereby heat transfer takes place through the said tubes and affects the other column of air within the said tubes.

8. An evaporative cooler wherein air is lowered in temperature without adding moisture thereto, and including:

(a) a housing;

(b) an air pump means delivering air through the housing;

(c) an air separating means in the housing and comprising at least one heat transfer tube conducting a column of air within and separately passing a column of air over said tube, the two columns of air passing within and over the tube from said separate openings;

(d) liquid distributing means discharging over said tube, whereby liquid evaporation takes place in the column of air passing over the said tube;

(e) and said tube being roughened to maintain a film of liquid thereon for said evaporation, whereby heat transfer takes place through the said tube and affects the other column of air within the said tube.

References Cited by the Examiner

UNITED STATES PATENTS

| 2,150,514 | 3/39 | McInnerney | 62—314 |
| 2,157,531 | 5/39 | Fisher | 62—314 |
| 2,174,060 | 9/39 | Niehart | 62—314 |
| 2,196,644 | 4/40 | Rubel | 62—314 |
| 2,209,999 | 8/40 | Patch | 62—314 |
| 3,025,685 | 3/62 | Whitlow | 165—133 |

FOREIGN PATENTS 225,556  11/59  Australia.

WILLIAM J. WYE, *Primary Examiner.*